United States Patent
Takama et al.

(10) Patent No.: US 8,353,234 B2
(45) Date of Patent: Jan. 15, 2013

(54) FOOD DOUGH CUTTING METHOD AND CUTTING APPARATUS

(75) Inventors: Akinori Takama, Utsunomiya (JP); Susumu Kominato, Utsunomiya (JP); Hiroshi Ueno, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 184 days.

(21) Appl. No.: 12/790,704

(22) Filed: May 28, 2010

(65) Prior Publication Data

US 2011/0008506 A1    Jan. 13, 2011

Related U.S. Application Data

(62) Division of application No. 11/938,219, filed on Nov. 9, 2007, now abandoned.

(30) Foreign Application Priority Data

Nov. 10, 2006   (JP) .................................. 2006-305993

(51) Int. Cl.
*B26D 7/06*  (2006.01)
*B27B 5/00*  (2006.01)
*B27B 5/34*  (2006.01)
*A21D 6/00*  (2006.01)
*A23P 1/317*  (2006.01)

(52) U.S. Cl. ........ 83/130; 83/425.4; 83/508.3; 426/503; 426/518

(58) Field of Classification Search ............ 83/130, 83/508.3, 425.4, 498, 499, 504, 13, 34, 76.6, 83/85, 112, 163, 209, 236, 287, 298, 713, 83/74, 75; 99/450.1, 450.2, 537, 538; 426/503, 426/518

See application file for complete search history.

(56) References Cited

U.S. PATENT DOCUMENTS 2,965,050 A * 12/1960 Doering ..................... 425/141
(Continued)

FOREIGN PATENT DOCUMENTS

JP          04066044         3/1992
(Continued)

OTHER PUBLICATIONS

EP Search Report dated Feb. 1, 2011 for EP Patent Application No. 07254386.1.

*Primary Examiner* — Ghassem Alie
*Assistant Examiner* — Bharat C Patel
(74) *Attorney, Agent, or Firm* — Myers Andras LLP; Joseph C. Andras

(57) ABSTRACT

A food dough cutting method and cutting device thereof capable of forming conveyed food dough strips that have nearly identical weight per unit time when dividing band shaped food dough into multiple food dough strips in the conveyance direction, and is further capable of performing the same number of cuts for each food dough strip when cutting each food dough strip along the width direction into food dough pieces having a specified weight are provided. The conveyed food dough is aligned to a position that is displaced by just an alignment displacement amount with respect to a reference position that is based on the installation position of cutting members. The alignment displacement amount is calculated based on the ratio of the width dimension of the food dough and the lengths of food dough pieces that are cut from food dough strips on both sides.

3 Claims, 6 Drawing Sheets

U.S. PATENT DOCUMENTS

| | | | |
|---|---|---|---|
| 4,095,926 A * | 6/1978 | Paul | 425/307 |
| 4,255,050 A | 3/1981 | Beckstein et al. | |
| 4,580,475 A | 4/1986 | Antonissen | |
| 4,868,951 A * | 9/1989 | Akesson et al. | 452/155 |
| 5,109,936 A * | 5/1992 | Ruppel | 177/25.19 |
| 5,209,939 A | 5/1993 | Kempf | |
| 5,235,885 A * | 8/1993 | Camarena et al. | 83/146 |
| 5,284,284 A | 2/1994 | Narishima et al. | |
| 5,300,787 A | 4/1994 | Schrauwen et al. | |
| 5,628,864 A * | 5/1997 | Kataigi et al. | 156/441.5 |
| 5,899,129 A * | 5/1999 | Sumida et al. | 83/76.9 |
| 6,170,391 B1 | 1/2001 | Pomara, Jr. | |
| 6,174,556 B1 * | 1/2001 | Bornhorst et al. | 426/503 |
| 6,415,697 B1 | 7/2002 | Brash et al. | |
| 6,441,321 B1 | 8/2002 | Hebenstreit | |
| 6,524,090 B1 | 2/2003 | Hayashi et al. | |
| 6,526,856 B2 * | 3/2003 | Newnes | 83/423 |
| 6,549,823 B1 * | 4/2003 | Hicks et al. | 700/159 |
| 6,645,063 B1 | 11/2003 | Volkl | |
| 6,685,457 B2 | 2/2004 | Hayashi et al. | |
| 6,800,313 B2 | 10/2004 | Hayashi et al. | |
| 7,007,595 B2 | 3/2006 | Ozery et al. | |
| 7,100,486 B2 * | 9/2006 | Akins et al. | 83/404.1 |
| 2003/0124234 A1 | 7/2003 | Hayashi et al. | |
| 2004/0009253 A1 * | 1/2004 | Hayashi et al. | 425/208 |
| 2004/0241301 A1 * | 12/2004 | Hayashi et al. | 426/502 |

FOREIGN PATENT DOCUMENTS

| | | |
|---|---|---|
| JP | 2001095468 | 4/2001 |

\* cited by examiner

FOOD DOUGH CUTTING METHOD AND CUTTING APPARATUS

RELATED APPLICATIONS

This application is a divisional of U.S. application Ser. No. 11/938,219, filed on Nov. 9, 2007, now abandoned, which claims the benefit under 35 U.S.C. §119 of Japanese patent application No. 2006-305993, filed Nov. 10, 2006.

BACKGROUND OF THE INVENTION

This invention relates to a cutting method and cutting device for separating conveyed band shaped food dough into multiple strips in the conveyance direction.

As means for separating a block of food dough, such as mixed and kneaded bread dough, into a specified amount (for example 40 g) of food dough pieces, there is a device that forms continuous band shaped food dough from a block of food dough, and divides that food dough into rectangular pieces, for example as the food dough is conveyed by a conveying device.

For example, the bread dough divider that is disclosed in Japanese patent application H4-66044 comprises: a belt conveyor that conveys the block of bread dough, an expansion roller that expands that block of bread dough to a near uniform thickness, a plurality of straight cutting rotary cutters that cut the expanded bread dough along the conveyance direction and divides the bread dough into multiple bread dough strips, and a cross cutting rotary cutter that cuts the divided bread dough strips in the width direction (horizontal direction that is orthogonal to the conveyance direction) and divides the bread dough strips into rectangular shaped bread dough pieces. By using this kind of food dough divider, identical rectangular shaped food dough pieces are formed from band shaped food dough.

However, when dividing band shaped food dough whose width varies in the conveyance direction into multiple food dough strips, the width on both sides of a food dough strip is not fixed, or in other words, strip shaped food dough having a varying width is obtained. Therefore, there is a problem in that productivity drops when it is necessary to discard the strip shaped food dough on both sides as unnecessary dough, and quality of the produced food dough becomes unstable and decreases when the strip shaped food dough on both sides is combined and remixed with the raw material.

The inventors have proposed a food dough formation system that is capable of obtaining pieces of a set weight of food dough from band shaped food dough (for example, refer to Japanese patent application 2001-95468). This food dough formation system comprises: a conveyor that conveys band shaped food dough that is formed to a nearly uniform thickness; an alignment device that aligns the conveyed position of the food dough; a separation and expansion device that comprises a cutter as a cutting member that divides the food dough into multiple food dough strips and a branched conveyor that divides and conveys the food dough strips; a weighing conveyor that weighs the amount of divided food dough that is conveyed; and a cutting device that cuts the divided food dough that is conveyed into rectangular pieces of food dough. When using this kind of food dough formation system, pieces of identical weights of food dough are formed from band shaped food dough. Also, the pieces of food dough can go through a secondary formation by manual formation or by a follow-up molder or rounding device.

However, when the width of the food dough constantly varies in the conveyance direction, or when the characteristics of the dough, such as the thickness or density, is not uniform in part of the dough, or particularly in the section on both sides, problems may occur in that when the food dough formation system divides the food dough into two strips of food dough whose width is constantly changing, large differences in the weight of the food dough that is conveyed per unit time occur, and when cutting each strip of food dough into pieces having a specified weight, extreme differences may occur in the number of cuts for each strip per unit time (for example, 1 minute), and the pieces of food dough become backed up (over supplied) in the secondary formation, or are not supplied.

Also, in the food dough formation system described above, when cutting the food dough that has been divided into two strips into pieces of food dough, the shape of the food dough pieces is formed into a horizontal rectangular shape (strips) as the weight of the dough decreases, and is not a suitable shape for secondary formation. In this case, by dividing the band shaped food dough into three or more strips of bread dough, and then cutting the strips of bread dough across the width direction to form food dough pieces, it is possible to obtain square food dough pieces, for example, that are suitable for secondary formation.

However, in the food dough formation system described above, when the width dimension of the food dough constantly varies in the conveyance direction, or when the characteristics of the dough, such as the thickness or density, is partially not uniform, particularly in the sections on both sides, then when dividing the band shaped food dough with an evenly spaced cutter in the conveyance direction into three or more strips of food dough, the width dimension of the strips of food dough on both sides varies. Therefore, a large difference occurs in the weight conveyed per unit time between the center food dough strip and the food dough strips on both sides, or between the food dough strips on both sides, and when cutting each of the food dough strips into food dough pieces having a specified weight, extreme differences occur in the number of cuts per unit time for each food dough strip, so during secondary formation, a problem may occur in that the food dough strips will become backed up (over supplied), or will not be supplied.

SUMMARY OF THE INVENTION

The object of the present invention is to provide a food dough cutting method and cutting device thereof capable of forming conveyed food dough strips that have nearly identical weight per unit time when dividing band shaped food dough into multiple food dough strips in the conveyance direction, and further capable of performing the same number of cuts for each food dough strip (synonymous with the number of cuts of food dough pieces) when cutting each food dough strip along the width direction (direction orthogonal to the conveyance direction) into pieces of food dough having a specified weight.

The present invention was invented in consideration of the problems described above, with the invention according to a first claim being a food dough cutting method comprising steps of: conveying band shaped food dough by way of a conveyor; detecting both end positions of the food dough by way of a food dough detection device; calculating the center position and width dimension of the width of the food dough by way of a control device based on the detection signal; aligning the center position of the width and the conveyance position of the food dough by way of an alignment device; dividing the band shaped dough into multiple food dough strips in the conveyance direction by way of cutting members that are downline from the conveyor; and cutting each food dough strip into food dough pieces having a specified weight by way of a food dough piece cutting device; wherein the conveyance position is a position that is displaced just an alignment displacement amount with respect to a reference position that is based on the installation position of the cutting members; and the alignment displacement amount is calculated by way of the control device based on the ratio of the width dimension of the food dough and the lengths of food dough pieces that are cut from food dough strips that are located on both sides.

The invention according to a second claim is a food dough cutting method comprising steps of: conveying band shaped food dough by way of a conveyor; detecting both end positions of the food dough by way of a food dough detection device; calculating the center position and width dimension of the width of the food dough by way of a control device based on the detection signal; aligning the center position of the width and the conveyance position of the food dough by way of an alignment device; dividing the band shaped dough into multiple food dough strips in the conveyance direction by way of cutting members that are downline from the conveyor; and cutting each food dough strip into food dough pieces having a specified weight by way of a food dough piece cutting device; wherein the conveyance position is a position that is displaced just an alignment displacement amount with respect to a reference position that is based on the installation position of the cutting members; and the alignment displacement amount is calculated by the control device based on the ratio of the width dimension of the food dough and the number of cuts per unit time when cutting the food dough strips located on both sides by the food dough piece cutting device.

The invention according to a third claim is a food dough cutting device comprising: a conveyor that conveys band shaped food dough; a dough width detection device that detects both end positions of the food dough; a control device that calculates the center position and width dimension of the width of the food dough based on the detection signal from the dough detection device; an alignment device that aligns the center position and conveyance position of the width of the food dough; and a multiple-strip cutting device that is located downline from the conveyor and that comprises cutting members that divide the food dough into multiple food dough strips in the conveyance direction; and a food dough piece cutting device that cuts the food dough strips into food dough pieces having a specified weight; wherein the conveyance position is a position that is displaced just an alignment displacement amount with respect to a reference position that is based on the installation position of the cutting members; the alignment displacement amount is a value that is calculated based on the ratio of the width dimension of the food dough and the lengths of food dough pieces that are cut from food dough strips that are located on both sides; and the control device controls the operation of the alignment device according to the alignment displacement amount.

The invention according to a fourth embodiment is a food dough cutting device comprising: a conveyor that conveys band shaped food dough; a dough width detection device that detects both end positions of the food dough; a control device that calculates the center position and width dimension of the width of the food dough based on the detection signal from the dough detection device; an alignment device that aligns the center position and conveyance position of the width of the food dough; and a multiple-strip cutting device that is located downline from the conveyor and that comprises cutting members that divide the food dough into multiple food dough strips in the conveyance direction; and a food dough piece cutting device that cuts the food dough strips into food dough pieces having a specified weight; wherein the conveyance position is a position that is displaced just an alignment displacement amount with respect to a reference position that is based on the installation position of the cutting members; the alignment displacement amount is a value that is calculated based on the ratio of the width dimension of the food dough and the number of cuts per unit time when cutting the food dough strips located on both sides by the food dough piece cutting device; and the control device controls the operation of the alignment device according to the alignment displacement amount.

Effect of the Invention

With this invention, when aligning the center position of the width of the band shaped food dough and conveying the food dough, alignment is not performed by aligning the food dough to a set position without moving the center position with respect to the cutting members as was done conventionally, but rather the center position and a set position, which is calculated by a control device based on the varying width dimension of the food dough and the varying cut lengths of food dough pieces that are divided from food dough strips, are aligned, so even when the characteristics of the dough, such as the width dimension, thickness or density of the dough are not uniform, it is possible to perform control so that weight of each of the food dough strips that is conveyed per unit time is mostly the same.

Also, with this invention, when dividing the band shaped food dough into multiple food dough strips, the plurality of cutting members, for example, rotating blades, are not arranged at fixed specified intervals as was done conventionally, but rather the interval between the cutting members is adjusted to an interval that is calculated by a control device based on the varying width dimension of the food dough and the varying cut lengths of food dough pieces that are divided from food dough strips, so even when the characteristics of the dough, such as the width dimension, thickness or density of the dough are not uniform, it is possible to perform control so that weight of each of the food dough strips that is conveyed per unit time is mostly the same.

In other words, with this invention, when dividing the conveyed food dough into multiple food dough strips along the conveyance direction, it is possible to suppress the occurrence of large differences in the weight of each of the food dough strips conveyed per unit time even when the characteristics of the dough, such as the width dimension, thickness or density of the dough are not uniform, so it is possible to make the number of cuts made per unit time (number of cuts) when cutting each of the food dough strips into food dough pieces having a specified weight the same, and thus it is possible to prevent a build up (oversupply), or undersupply of food dough pieces in the secondary formation section that follows.

DESCRIPTION OF THE PREFERRED EMBODIMENTS

Figure 1:
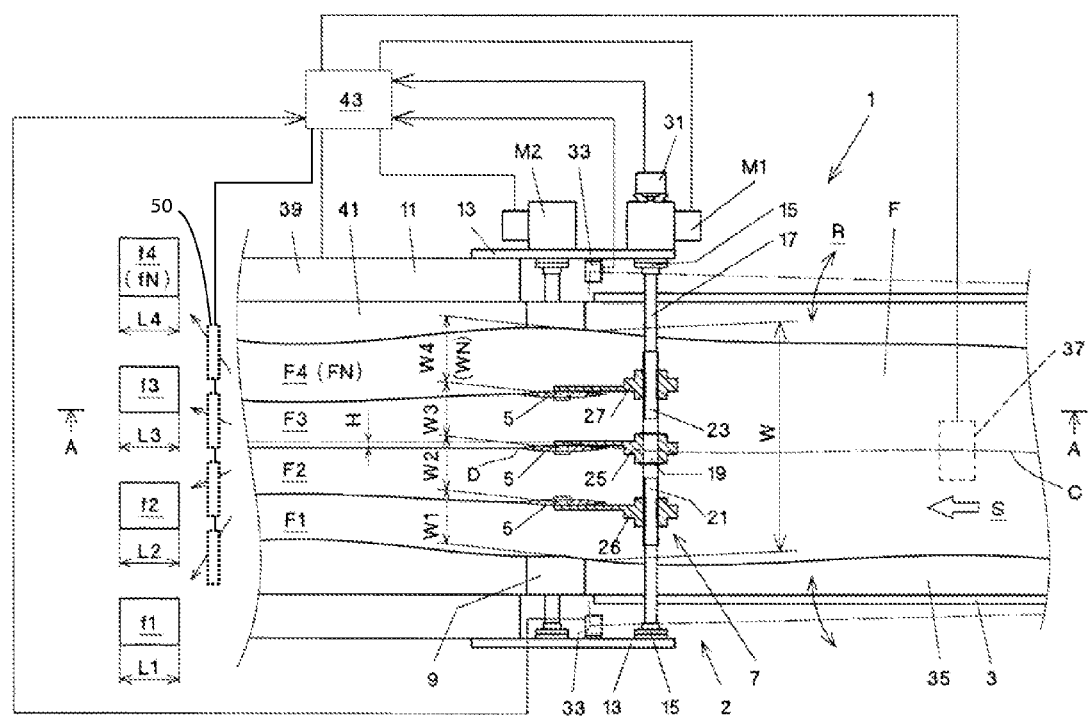
FIG. 1 is a top view of the cutting device 1 of a first embodiment of the invention.
Figure 2:
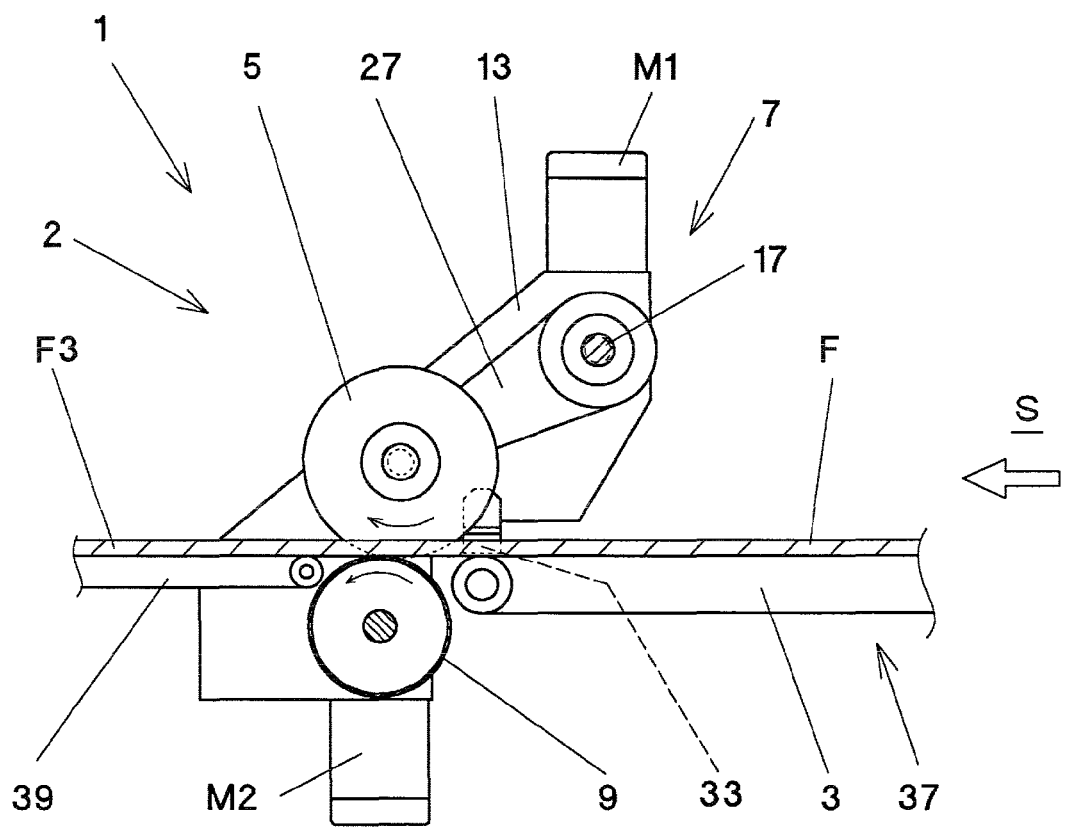
FIG. 2 is a front view as seen in the direction of the section A-A in FIG. 1.
Figure 3:
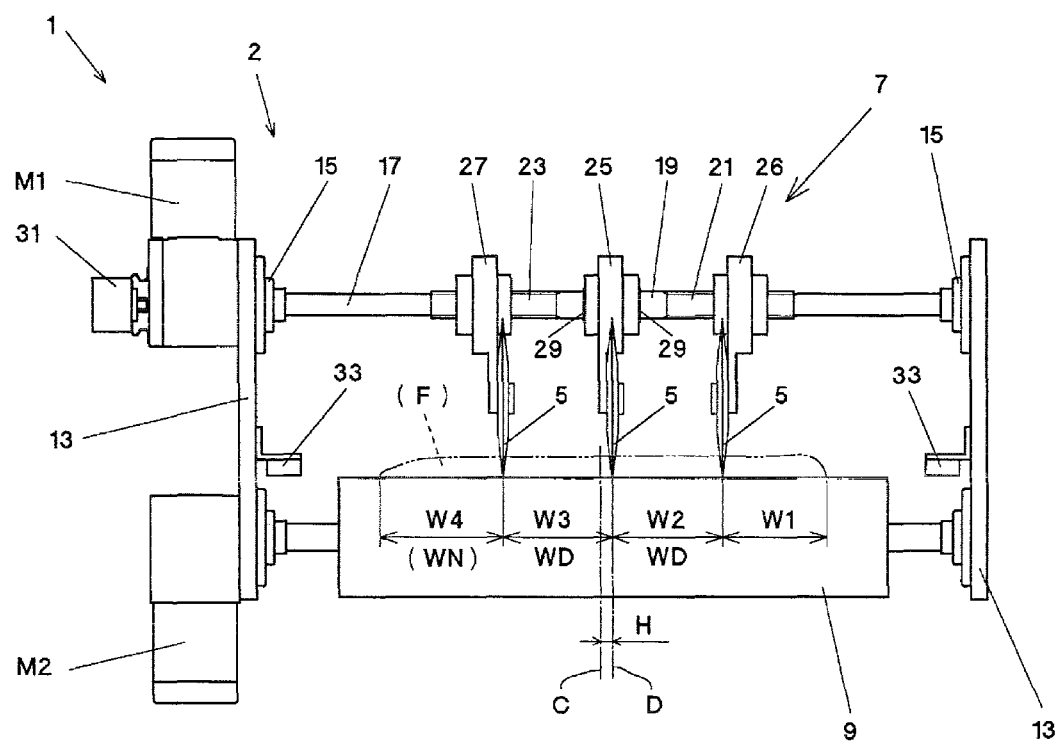
FIG. 3 is a side view of the cutting device 1 as seen toward the left in FIG. 2

The cutting device 1 of a first embodiment of the invention will be explained using the drawings. FIG. 1 is a top view of a cutting device 1. FIG. 2 is a front view as seen in the direction of section A-A of FIG. 1. FIG. 3 is a left side view of FIG. 2.

As shown in FIG. 1 to FIG. 3, the cutting device 1 comprises a multiple-strip cutting device 2 that cuts band shaped food dough F that is conveyed by a conveyor 3 along the conveyance direction S into four food dough strips F1, F2, F3, F4. The multiple-strip cutting device 2 comprises: three circular rotating blades 5 as the cutting members; a cutting member interval adjustment mechanism 7 that adjusts the installation interval between the rotating blades 5; and a conveyor roller 9 that conveys the food dough F against the rotating blades 5. Also, the multiple-strip cutting device 2 is installed on opposing side plates 13 that are fastened to the side surfaces of the conveyer frame 11 of the conveyor 3.

The cutting member interval adjustment mechanism 7 supports a rotating shaft 17 by a bearing 15 that is installed on the inside of the opposing side plates 13 so that it can freely rotate, and one end of that rotating shaft 17 is coupled with a control motor M1. The rotating shaft 17 comprises a shaft unit 19 in the center section, and on both sides of the shaft unit 19 there is a left screw unit 21 and right screw unit 23 whose threads are formed opposite from each other. Also, there are support members 25, 26, 27 that are installed on the rotating shaft 17, and they support the three rotating blades 5 so they are evenly spaced, a fixed support member 25 fits on the shaft unit 19 and is secured in the axial direction by a retaining ring 29, and movable support members 26, 27, which have threaded holes that correspond to the screw threads on the left screw section 21 and right screw section 23, can move in the axial direction of the rotating shaft and screw onto the left screw section 21 and right screw section 23. Therefore, in FIG. 2, when the rotating shaft 17 rotates to the right, the rotating blades 5 approach each other and the interval between them becomes narrow, and when the rotating shaft 17 rotates to the left, the rotating blades 5 separate from each other and the interval between them becomes wider. The support members 25, 26, 27 that support the rotating blades 5 are located so that they are connected to a weight or air-pressure cylinder (not shown in the figures) so that the rotating blades 5 are pressed against the conveyor roller 9.

Furthermore, a rotary shaped pulse encoder 31 is connected to the end section of the output shaft of the control motor M1 that is connected to the rotating shaft 17, and the interval WD between the rotating blades 5 is calculated by detecting the angle of rotation of the rotating shaft 17 based on the number of pulses that is output from the pulse encoder 31. As the detection device for calculating the interval WD between the rotating blades 5, it is possible to place distance sensors on the inside of the side plates 13 and to directly detect the distance to the rotating blades 5.

Also, the conveyor roller 9 is connected to a control motor M2 underneath the rotating blades 5 and on the downline side of the conveyor 3 so that it can rotate, and together with conveying the food dough that is aligned and conveyed by the conveyor 3, it works together with the opposing rotating blades 5 to cut the food dough F into four food dough strips F1, F2, F3, F4.

Moreover, there are dough width detection devices 33, for example distance sensors, located on the inside of the side plates 13 so that they face each other, and they measure the distance to both end sections of the food dough F that is conveyed by the conveyor 3, and calculate the center position C of the width of the food dough F based on the detection signal from the dough width detection devices 33. In this embodiment, the dough width detection devices 33 are located near the downline end of the conveyor 33. The dough width detection devices 33 are not limited to being distance sensors, and they could be a plurality of photoelectric sensors that are located along the width direction over the conveyor, or they could be camera sensors that take images of the food dough, or could be any device capable of detecting both sides of the food dough F.

The conveyor 3 is used as a conveyance unit that conveys food dough that is formed into a band shape by a well known dough supply device such as that disclosed in Japanese patent application H4-66044 or Japanese patent application 2001-95468. The conveyor 3 comprises a continuous belt 35 that wraps around a plurality of rollers, and it is coupled and connected to a control motor (not shown in the figures) by a power transmission mechanism such as a sprocket and chain.

Also, there is an alignment device 37 located on the conveyor 3 for aligning the center position C of the width of the food dough F, which is calculated based on the detection signal from the dough width detection devices 33, so that it is in the conveyance position. The alignment device 37 is located so that it can move the downline end of the conveyor 3 back and forth in the horizontal direction as indicated by arrows R with the upline end of the conveyor 3 as the center. The alignment device 37 is not limited to this, and could be a device as disclosed in Japanese patent application 2001-95468 that aligns the center position C of the width of the food dough F in the conveyance position by moving the belt 35 in the width direction by moving the end rollers of the conveyor in the width direction that is orthogonal to the conveyance direction S.

A conveyor 39 that conveys the food dough strips cut into four strips F1, F2, F3 and F4 is connected on the downline side of the multiple strip cutting device 2, and it comprises a continuous belt 41 that wraps around a plurality of rollers, and is coupled with a control motor (not shown in the figure) by way of a power transmission mechanism such as a sprocket and chain. Furthermore, expansion conveyors expand and convey the food dough strips F1, F2, F3 and F4 as disclosed in Japanese patent application 2001-95468, first weighing conveyors measure the weight and convey the food dough strips that are supplied from each of the expansion conveyors, dough cutting devices that are guillotine type cutting devices cut the food dough strips F1, F2, F3 and F4 into food dough pieces f1, f2, f3 and f4 when the weights measured by the first weighing conveyors match a set value, and second weighing conveyors measure the weight of the cut food dough pieces f1, f2, f3 and f4 are each connected downline from the conveyor 39 so that they are placed horizontally across the width direction. The conveyor 39 can function as the expansion conveyors.

A control device 43 controls the driving of all of the devices, and together with controlling the conveyance speed of the conveyor 3, roller 9, conveyor 39 and the like, it has a computation device that calculates the center position C of the width of the food dough F based on the detection signal from the food width detection devices 33. Also, the control device 43 sends a width direction correction command to the alignment device 37 to move the conveyor back and forth in the horizontal direction so that the center position C is shifted a specified amount (hereafter, referred to as the alignment displacement amount H) with respect to a reference position D that is based on the installation position of the cutting members 5 (in this embodiment, this is the position of the blade tips that are supported by the fixed support member 25). This reference position D is the starting position for positioning when aligning the center position C to a specified conveyance position, and is not limited to the position described above (position of the blade tips) but can be set arbitrarily.

Furthermore, the control device 43 calculates the varying width W of the food dough based on the detection signal from the dough width detection devices 33, and together with calculating the width dimensions W1, W2, W3, W4 of the food dough strips F1, F2, F3, F4 based on the change in that width dimension W, controls the drive of the control motor M1 so that the rotating shaft 17 rotates to the left or right in order that the interval WD between the rotating blades 5 matches the calculated width dimension W2. The interval WD between the rotating blades 5 is calculated based on the initial set interval between the rotating blades 5, the direction of rotation of the control motor M1 and the number of pulses sent from the pulse encoder 31 to the control device 43.

Also, the control device 43 controls operation of a dough piece cutting device 50 so that it cuts the food dough strips F1, F2, F3, F4 into food dough pieces f1, f2, f3, f4 when the weight of each of the food dough strips F1, F2, F3, F4 that were cut and weighed by the first weighing conveyors as disclosed in Japanese patent application 2001-95468 match a set value. In each of the expansion conveyors, there is a rotary type pulse encoder that is connected to and coupled with a drive motor or roller for example, and when the number of pulses that corresponds to the length of the cut food dough pieces is sent to the control device 43, it calculates the cut lengths L1, L2, L3, L4 of the food dough pieces f1, f2, f3, f4. For example, the cut length L1 is not always the same, and as the width dimension W of the food dough F varies, or as the characteristics of the food dough F become uneven, it changes each time a food dough piece f1 is cut.

The food dough pieces f1, f2, f3, f4 are cut based on a set weight, and cutting is further controlled by the control device 43 so that the cut lengths L1, L2, L3, L4 that are cut along the width direction are the same. Also, when cutting food dough F, which is overall uniform, into four food dough pieces f1, f2, f3, f4, the interval WD between the rotating blades 5 should be adjusted so that it is variable, and so that the width dimensions W1, W2, W3, W4 become the same. However, when the width dimension of the food dough F varies, or when the characteristics of the dough, particularly the thickness or density of the sections on both sides, are partially not uniform, the set position for aligning the center position C and the interval WD between the cutting members must be controlled by the control device, and the width dimensions W1, W2, W3, W4 must each be adjusted so that the cut lengths L1, L2, L3, L4 become the same. In this first embodiment of the invention, the food dough strips F2, F3 that are arranged on the inside of food dough strips F1, F4 on both sides were explained as having nearly the same characteristics. Also, the food dough pieces f2, f3 were explained as being cut at nearly the same timing, and as being cut into nearly the same shape each time the food dough pieces f2 and f3 are cut. In other words, the width dimensions W2, W3 and cut lengths L2, L3 of the food dough pieces f2, f3 are nearly the same each time the food dough pieces f2 and f3 are cut.

Next, the method used by the control device 43 for calculating the interval WD between the rotating blades 5 (synonymous with the width dimension W2 of the food dough strip F2) and the alignment displacement amount H will be explained. As an example of the calculation method, the alignment displacement amount H and the interval WD between the cutting blades 5 are calculated based on the dimensions of 20 continuous food dough pieces f1, f2, f3, f4 of each strip, and the average cut lengths of the 20 continuous food dough pieces f1, f2, f3, f4 of each strip are taken to be AVL1, AVL2, AVL3 and AVL4. The number of food dough pieces f1, f2, f3, f4 for calculating the average cut lengths AVL1, AVL2, AVL3, AVL4 is not limited to 20, and can be arbitrarily set.

The average width dimension of the food dough F is taken to be the average width dimension AVW. The average width dimension AVW is the average value that is calculated based on the measured values of 20 successive width dimensions W of the food dough F that are measured at the time when the food piece f2 is cut from the food dough strip F2. The average width dimension AVW can also be the average value that is calculated based on the measured values of the continuously measured width dimension W of the food dough that constantly varies while 20 food dough pieces f2 are cut.

The interval WD between the rotating blades 5 is calculated and controlled by the control device 43 according, for example, to Equation 1 below.

$$WD = \frac{W}{4} \times E2 \qquad \text{[Equation 1]}$$

$$= \frac{W}{4} \times E1 \times \frac{\frac{(AVL2 + AVL3)}{2}}{\frac{(AVL1 + AVL4)}{2}} \times K$$

$$E2 = E1 \times \frac{\frac{(AVL2 + AVL3)}{2}}{\frac{(AVL1 + AVL4)}{2}} \times K$$

The interval WD between the rotating blades 5 varies when the width dimension W of the food dough F varies or when the characteristics of the food dough are not uniform, and in this embodiment, the food dough F is divided into four strips, so the interval WD is calculated by multiplying the value obtained by dividing the width dimension W by 4 (strips) (W/4) with a width adjustment ratio E as a correction value that is calculated based on the average cut lengths AVL1, AVL2, AVL3 AVL4 of the food dough pieces f1, f2, f3, f4.

The width adjustment ratio E is a value that is updated every time the dimensions of 20 continuous food dough pieces f1, f2, f3, f4 are measured, and the updated width adjustment ratio E2 is calculated as the product of the previous width adjustment ratio E1, the ratio of the average lengths of the food dough pieces on both sides and in the center (AVL2+AVL3)/(AVL1+AVL4) that is calculated using the ratio of the average cut lengths of the food dough pieces in the center f2, f3 ((AVL2+AVL3)/2) with respect to the average cut lengths of the food dough pieces on both sides f1, f4 ((AVL1+AVL4)/2), and a width correction factor K that takes into consideration the characteristics of the food dough F1, F4 on both sides. When the average cut lengths of the food dough pieces on both sides f1, f4 ((AVL1+AVL4)/2) differ from the average cut lengths of the food dough pieces in the center f2, f3 ((AVL2+AVL3)/2), the ratio of the average lengths of the food dough pieces on both sides and in the center (AVL2+AVL3)/(AVL1+AVL4) is not 1, so the width adjustment ratio E is updated, and the interval WD between the rotating blades 5 changes. The width correction factor K is a preset value that is input to the control device 43, and changes according to the characteristics of the food dough F.

When adjusting the interval WD between rotating blades 5 based on Equation 1 above, the sum of the weight of the food dough strips on both sides F1, F4 conveyed per unit time and the sum of the weight of the food dough strips in the center F2, F3 are controlled so that they become the same.

Also, when the characteristics of the dough, such as the thickness or density in the sections on both sides of the food dough F as described above, are not uniform, the width dimensions W1, W4 of the food dough strips on both sides F1, F4 are obtained by dividing the value of the width dimensions W2, W3 of the food dough strips F2, F3 subtracted from the width W of the food dough F by 2, and when a specified weight of food dough pieces f1, f4 is cut from the food dough strips F1, F4 on both sides, the lengths of the cut lengths L1,L4 are not the same. Therefore, in this first embodiment of the invention, the center position C of the food dough F is shifted a specified amount (alignment displacement position H) with respect to a reference position D, and by performing adjustment to increase or decrease the widths W1, W4 of the food dough strips F1, F4, the alignment displacement position H is controlled so that the cut lengths L1, L4 of the food dough pieces f1, f4 become the same.

The alignment displacement position H is calculated and controlled by the control device 43 according to Equation 2 below, for example.

$$H2 = H1 + J \qquad \text{[Equation 2]}$$
$$= H1 + \left[ \frac{AVW - \frac{AVW}{4} \times 2 \times E2}{2} \times \left( \frac{AVL1}{AVL4} \times U - 1 \right) \right]$$
$$J = T \times \left( \frac{AVL1}{AVL4} \times U - 1 \right)$$
$$T = \frac{AVW - \frac{AVW}{4} \times 2 \times E2}{2}$$

The alignment displacement position H is a value that is updated each time the dimensions of 20 continuous food dough pieces f1, f2, f3, f4 for each strip are measured, and the updated alignment displacement position H2 is calculated by adding the previous alignment displacement H1 and the alignment position correction value J (H1+J). The alignment position correction value J is a value that is obtained by subtracting 1 from the product of the virtual average width dimension T of the food dough F1, F4 on both sides, the ratio of average cut lengths on both side (AVL1/AVL4), which is the ratio of the average cut length AVL1 of the food piece f1 with respect to the average cut length AVL4 of the food piece f4, and an alignment correction factor U that takes into consideration the characteristics of the food dough F1, F4 on both sides (T×(AVL1/AVL4)×U−1).

Furthermore, the virtual average width dimension T is calculated by taking the product of the average width AVW of the food dough divided by 4 (strips), the number of strips 2 (strips) which are the food dough strips F2, F3 in the center, and the width adjustment ratio E2 ((AVW/4)×2×E2), and then subtracting that value from the average width dimension AVW and dividing the result by 2 (represents the food dough strips F1, F3 on both sides) ((AVW−(AVW/4)×2×E2)/2).

As can be understood from the explanation above, the alignment displacement amount H is calculated based on the average width dimension AVW of the food dough F, and the ratio of the average cut lengths on both sides (ALV1/ALV4). Therefore, when the average width dimension AVW is updated, or when the ratio of the average cut lengths on both sides (ALV1/ALV4) is not 1, in other words, when there is a difference in the average cut length AVL4 of food dough piece f4, and the average cut length AVL1 of food dough piece f1, the alignment displacement amount H varies.

When the alignment displacement amount H is adjusted based on the Equation 2 above, the weights of the food dough strips F1, F4 on both sides that are conveyed per unit time are controlled so that they are the same.

Other length-related parameters may be considered with equal utility. It is possible, for example, to express the cut lengths L1 to L4 of the food dough pieces f1 to f4 as the number of cuts per unit time of the food dough strips F1 to F4. When the number of cuts per unit time of the food dough strips F1 to F4 is N1 to N4 (times/min), and the distance move per unit time is taken to be V, then L1=V/N1, L2=V/N2, L3=V/N3 and L4=V/N4. Here, the distance moved per unit time V is the velocity of movement of the conveyor 39, so the same value V is used for all of the food dough strips F1 to F4. Therefore, it is also possible to use the average cut lengths AVL1=V/AVN1, AVL4=V/AVN4, etc. In this case, in Equation 2, AVL1/AVL4=(V/AVN1)/(V/AVN4)=AVN4/AVN1. In other words, it is also possible to perform control based on the ratio of number of cuts per unit time AVN4/AVN1 when cutting the food dough strips located on both sides by the dough piece cutting device instead of control based on the ratio of cut lengths AVL1/AVL4. When actually performing control of the dough piece cutting device by controlling the number of cuts per unit time, performing control of the alignment displacement amount based on the ratio AVN4/AVN1 is easier than performing control based on the ratio AVL1/AVL4.

In this embodiment, the case of calculating the interval WD between rotating blades 5, and the alignment displacement amount H using Equation 1 and Equation 2 was explained, however, the embodiment is not limited to change according to these equations. For example, calculating the virtual average width dimension T, which is used in the calculation of the alignment displacement amount H, based on the average dough width AVW and the width adjustment ratio E was explained, however, this value can also be calculated based on the average value ((AVW1+AVW4)/2) of the average values AVW1, AVW4 of the width dimensions W1, W4 of the food dough strips F1, F4 that are measured continuously 20 times at the timing when the food dough piece f2 is cut from the food dough F.

Also, substituting the average dimensions (AVW, AVL1, etc.) into Equation 1 and Equation 2 above was explained, however, it is possible to replace the average dimensions with the dimensions (W, L1, etc.). In other words, it is possible to enter the dimensions into Equation 1 and Equation 2 each time the dimensions are measured, and to control the value of the interval WD between rotating blades 5 and the alignment displacement amount H.

Next, the operation of the cutting device 1 is explained. As shown in FIG. 1, band shaped food dough F is conveyed at a specified speed by a conveyor 3. The width dimension W of the food dough F varies along the conveyance direction S, and the food dough F is conveyed so that the center position C in the width varies in a winding manner as it is conveyed. Distance data to the end section on both sides of the food dough that is conveyed in the detection position of the dough width detection devices 33 is detected by the dough width detection devices 33, and based on the detection signal, the center position C and width dimension W of the food dough F at the detection position is calculated by the control device 43. Also, the conveyor 3 is moved and back and forth in the horizontal direction so that the center position C is moved the alignment displacement amount H with respect to the reference position D to align the food dough F. Also, the aligned food dough F1 is conveyed onto a conveyor roller 9 that rotates at the same speed as the conveyor 3.

Furthermore, together with calculating the interval WD between rotating blades 5 (same as the width dimension W2 of the food dough strip F2) based on the value of the calculated width dimension W of the food dough F, a correction command instruction is sent from the control device 43 to the control motor M1 so that the interval between rotating blades 5 coincides with the interval WD, and the intervals between each of the rotating blades 5 that are supported by movable support members 26, 27 of the cutting member interval adjustment mechanism 7 are adjusted. When moving the supports so that the interval WD between rotating blades 5 becomes narrower, the correction instruction instructs the control motor M1 to rotate the rotating shaft 17 shown in FIG. 2 to the right, which brings each of the rotating blades 5 closer together. Also, when the moving the supports so that the interval WD between rotating blades 5 becomes wider, the correction instruction instructs the control motor M1 to rotate the rotating shaft 17 shown in FIG. 2 to the left, which moves the rotating blades 5 apart from each other. The distance that the rotating blades 5 are moved is calculated based on the number of pulses that is sent to the control device 43 from the pulse encoder 31.

Band shaped food dough F is divided into four food dough strips F1, F2, F3, F4 having widths W1, W2, W3, W4 that vary based on the fluctuation of the width dimension W, and conveyed by a conveyer 39. After the food dough strips F1, F2, F3, F4 have been expanded in the width direction by an expansion conveyors and conveyed, the food dough strips F1, F2, F3, F4 are weighed by a first weighing conveyor, and cut into food dough pieces f1, f2, f3, f4 by a food dough piece cutting device at timing when the weight coincides with a set value so that the pieces are all a specified weight. Also, after every 20 pieces have been cut of each of the food dough pieces f1, f2, f3, f4, an alignment position correction value J for calculating the alignment displacement amount H, and a width adjustment ratio E for calculating the interval WD between rotating blades 5 are updated.

Therefore, for each of the food dough strips F1, F2, F3, F4 that are weighed by the first weighing conveyor, large differences in width of the dough that is conveyed per unit time (for example one minute) are suppressed, and it is possible to keep the number of cuts per unit time (number of cut pieces) of each strip nearly the same. Also, in the secondary formation that follows, problems such as of accumulation of food dough pieces (over supply), or no supply of food dough pieces are solved.

Figure 4:
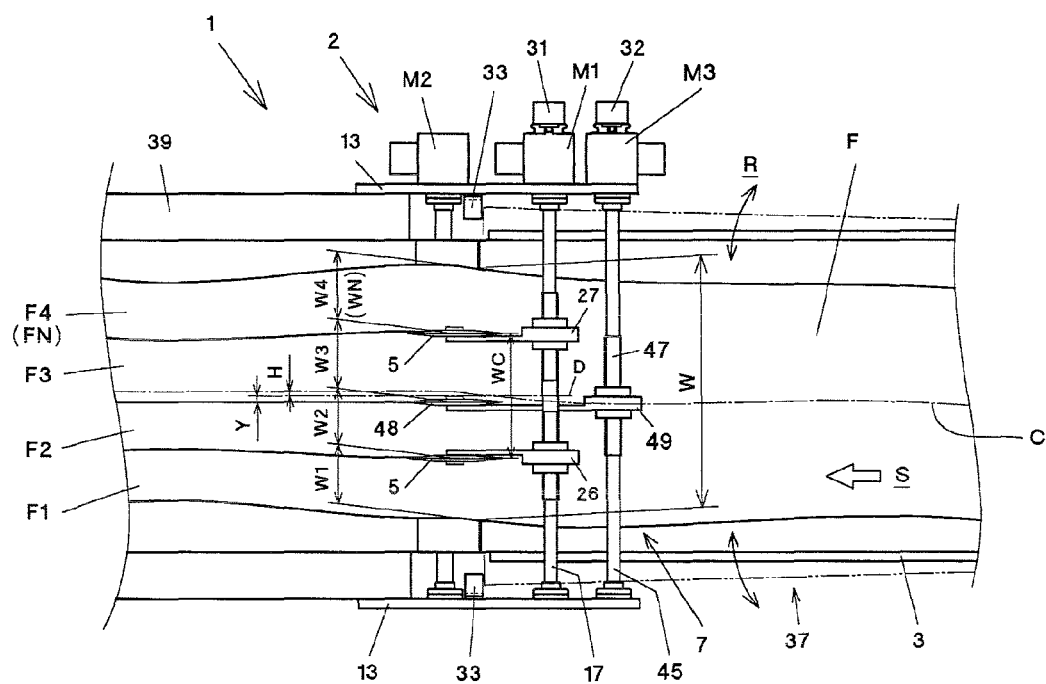
FIG. 4 is a top view of the cutting device 1 of a second embodiment of the invention.

Next, a second embodiment of the invention will be explained. FIG. 4 is a drawing showing the cutting device 1 of this second embodiment of the invention. In this second embodiment, the same reference numbers are given to components that perform the same function as in the first embodiment, and any redundant explanation is omitted. In this second embodiment, the case is explained of performing control so that when the band shaped dough F is divided into four food dough strips F1, F2, F3, F4, the cut lengths L1, L2, L3, L4 are made the same by adjusting the width dimensions W2, W3 of the two center food dough strips F2, F3.

As the cutting member interval adjustment mechanism 7 of the multiple strip cutting device 2, one more rotating shaft 45 is placed on the upline side of the rotating shaft 17, and a movable support member 49 is screwed onto the left screw section 47 that is formed in the center section of the rotating shaft 45 so that it can move. Furthermore, on the base end of the movable support member 49 there is a rotating blade 48 as a cutting member 5, and that rotating blade 48 is located between the two rotating blades 5 that are supported by the rotating shaft 17. The rotating shaft 45 is connected to a control motor M3 that is controlled by the control device 43, and is set so that it can be rotated. Also, a pulse encoder 32 is coupled with the output shaft of the control motor M3.

In this second embodiment, the reference position D is located between the rotating blades 5 on both sides that are supported by the rotating shaft 17 by way of movable support members 26, 27. Also, the interval W2 between the rotating blade 5 and rotating blade 48 that cut the food dough strip F2, is taken to be equal to the interval W3 between the rotating blade 48 and rotating blade 5 that cut the food dough strip F3.

The interval WC between the rotating blades 5 on both sides is expressed as (W2+W3), and can be calculated from Equation 1 as two times the value of the interval WD between the rotating blades 5 that was explained in the first embodiment (WC=(W2+W3)=2×WD). Therefore, it is possible to control the rotation of the control motor M1 by a correction instruction from the control device 43 that is based on the interval WD, and to adjust the position (interval) of the rotating blades 5 on both sides by way of the rotating shaft 17 and movable support members 26, 27.

Also, the alignment displacement amount H of the center position C of the width of the food dough F with respect to the reference position D can be calculated using Equation 2 that was explained for the first embodiment. When doing this, being able to perform control based on the ratio of cut lengths, or control based on the ratio of the number of cuts per unit time is the same.

Moreover, the displacement amount of the rotating blade 48 with respect to the reference position D is called the center displacement amount Q, and it is calculated and controlled by the control device 43 using Equation 3 below.

$$Q2 = Q1 + Y \quad \text{[Equation 3]}$$
$$= Q1 + \frac{AVWC}{2} \times \left(\frac{AVL2}{AVL3} \times G - 1\right)$$
$$Y = Z \times \left(\frac{AVL2}{AVL3} \times G - 1\right)$$
$$Z = \frac{AVWC}{2}$$

In Equation 3, AVWC is the average dimension (average value) of the width dimension of the food strips F2, F3 that are divided by the rotating blades 5 on both sides, and is the average interval (average value) of the interval WC. The average width dimension AVWC is the average value that is calculated based on 20 measured values for the interval WC that were measured at the timing of cutting the food dough pieces f2 from the food dough strip F2. The average interval AVWC may also be the average value that is calculated based on measured values of the continually changing dimension of the interval WC that is measured continuously while 20 food dough pieces f2 are cut.

The center displacement amount Q is a value that is updated each time after measuring the dimensions of 20 continuous food pieces f1, f2, f3, f4 for each strip, and the updated center displacement amount Q2 is calculated by adding the previous center displacement amount Q1 and a center position correction value Y (Q1+Y). The center position correction value Y is a value that is obtained by multiplying the virtual center average width dimension Z, which is expressed as the average center width dimension AVWC that is based on the width dimension of the food dough strips F2, F3 on both sides divided by 2 (strips) (AVWC/2), by the value obtained by subtracting one from the product of the average cut length ratio for both sides, which is the ratio of the average cut length AVL2 of the food dough pieces f2 with respect to the average cut length AVL3 of the food dough pieces f3 (AVL2/AVL3), and a position correction coefficient G, which takes into consideration the differences in the characteristics of the food dough strips F2, F3 on both sides (Z×((AVL2/AVL3)×G−1)). The position correction coefficient G is a value that is input and set in the control device 43 beforehand, and is a value that changes according to the characteristics of the food dough F.

The center displacement amount Q is calculated based on the average dimension AVWC of the dimension WC (interval WC), which is the sum of the width dimensions W2, W3 of the center food dough strips F2, F3, and the ratio of the average cut lengths on both sides (AVL2/AVL3). Therefore, when the average interval AVWC is updated, or when the ratio of the average cut lengths on both sides (AVL2/AVL3) is not 1, or in other words, when the average cut length AVL3 of the food dough pieces f3 differs from the average cut length AVL2 of the food dough pieces f2, the center displacement amount Q varies.

In this second embodiment, by adjusting the width dimension W2, W3 of the two food dough strips F2, F3 in the center, it is possible to control the weights of the food dough that is conveyed per unit time of each of the food dough strips F1, F2, F3, F4 that are weighed by each of the first weighing conveyors so that they are uniform, and it is possible to make the number of cuts per unit time (number of cuts) of each strip mostly the same.

Figure 5:
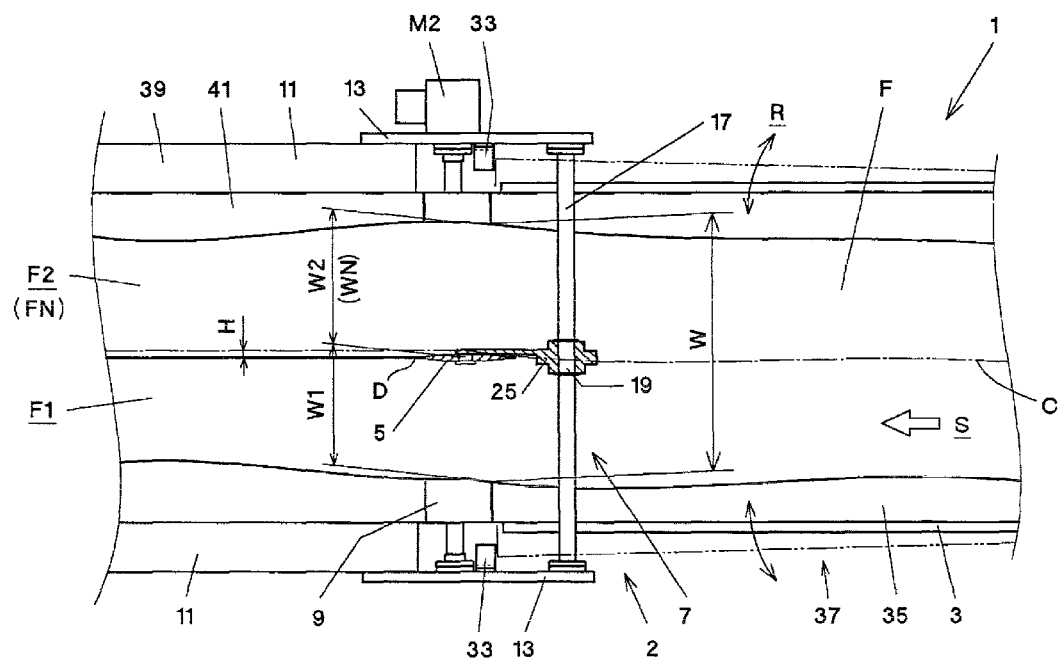
FIG. 5 is a top view of the cutting device 1 of a third embodiment of the invention.

Next, a third embodiment of the invention will be explained. FIG. 5 is a drawing showing the construction of the cutting device 1 of a third embodiment of the invention. In this third embodiment, the same reference numbers will be given to components having the same function as those in the first and second embodiments described above, and any redundant explanation of them will be omitted.

In the case of the cutting device that is disclosed in Japanese patent application 2001-95468, when dividing food dough into two food strips, the center position C of the width of the food dough F is aligned without displacement with respect to the cutting position of the cutting member as a reference position, and is divided into equal parts so that the width dimensions of the food dough strips F1, F2 on both sides are symmetrical. However, when the characteristics of the food dough, such as the thickness or density of both side portions of the food dough that is divided as described above, become non uniform, the width dimensions W1, W2 of the food dough strips F1, F2 on both sides are obtained by dividing the width dimension W of the food dough F into two equal divisions, and when cutting the food dough strips F1, F2 on both sides into food dough pieces f1, f2 having a specified weight, the cut lengths L1, L2 may not be the same length. Therefore, in this third embodiment of the invention, control is performed so that the center position C of the food dough F is aligned by displacing it a specified amount (alignment displacement amount H) with respect to the reference position D, and so that the cut lengths L1, L2 of the food dough pieces f1, f2 become the same by performing adjustment by adding to or subtracting from the width dimensions W1, W2 of the food dough strips F1, F2. The reference position D in this embodiment is the position of the blade tip of the rotating blade 5 that is supported by way of the fixed support member 25 on the support shaft 51 that is fastened between the side frames 13 on both sides.

The displacement position H is calculated and controlled by the control device 43 according to Equation 4 below.

$$H2 = H1 + J2 \quad \text{[Equation 4]}$$
$$= H1 + \frac{AVW}{2} \times \left(\frac{AVL1}{AVL2} \times U2 - 1\right)$$
$$J2 = T2 \times \left(\frac{AVL1}{AVL2} \times U2 - 1\right)$$
$$T2 = \frac{AVW}{2}$$

The alignment displacement amount H is a value that is updated each time the dimensions of 20 continuous food dough pieces f1, f2 of each strip are measured, and the updated alignment displacement amount H2 is calculated by adding the previous alignment displacement amount H1 with an alignment position correction value J2 (H1+J2). The alignment position correction value J2 is a value that is obtained by multiplying the virtual average width dimension T2, which is expressed as the average width dimension AVW of the food dough F divided by 2 (strips) (AVW/2), by the value obtained by subtracting 1 from the product of the average cut length ratio for both sides, which is the ratio of the average cut length AVL1 of the food dough pieces f1 with respect to the average cut length AVL2 of the food dough pieces f2 (AVL1/AVL2), and an alignment correction coefficient U2, which takes into consideration the differences in the characteristics of the food dough strips F1, F2 on both sides (T2×((AVL1/AVL2)×U2−1)).

The alignment displacement amount H is calculated based on the ratio between the average width dimension AVW of the food dough F and the ratio of the average cut length on both sides (AVL1/AVL2). Therefore, when the average width dimension AVW is updated, or when the ratio of the average cut length on both sides (AVL1/AVL2) is not 1, or in other words, when there is a difference between the average cut length AVL2 of the food dough piece f2 and the average cut length AVL1 of the food dough piece f1, the alignment displacement amount H varies. Being able to use the ratio of cut lengths per unit time AVN2/AVN1 of F2 and F1 instead AVL1/AVL2 is the same as in the first embodiment.

As can be seen from the explanation above, when dividing band shaped food dough F into N number (where N is an integer of 2 or greater) of food dough strips F1, F2, . . . F(N−1), FN, by performing alignment by displacing the center position of the width of the food dough F an alignment displacement amount H with respect to the reference position D that is based on the installation position of the cutting member 5, and by further adjusting the intervals between the cutting members that cut the food dough F into three or more multiple strips so that they are evenly spaced or so that the intervals are a controlled interval, it becomes possible to control each of the food dough strips F1, F2, . . . F(N−1), FN so that the weights conveyed per unit time become the same. The equations for calculation are not limited to Equations 1 to 4 and can be changed as long as the equations are based on the ratio between the width dimension of the food dough and the cut lengths of the food dough pieces on both sides.

Figure 6:
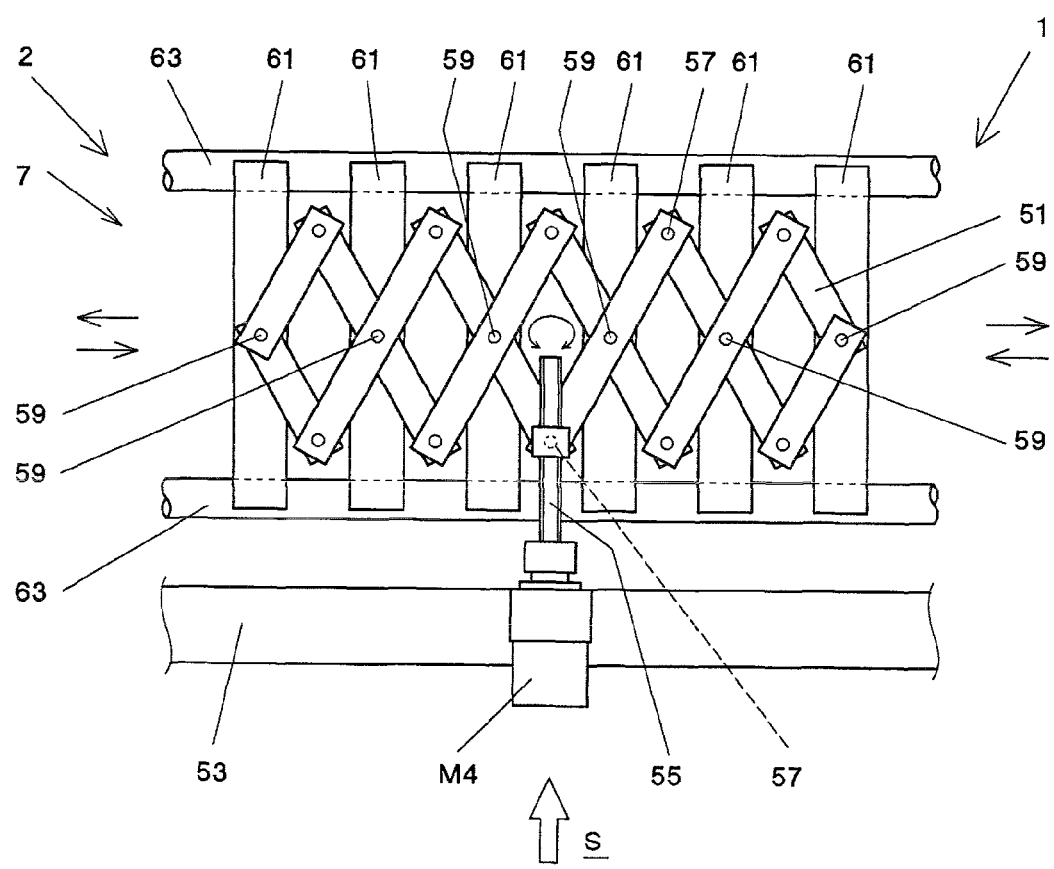
FIG. 6 is a top view of the multiple-strip cutting device 2 of the cutting device 1 of a fourth embodiment of the invention.

FIG. 6 is a drawing showing the multiple-strip cutting device 2 of the cutting device 1 of a fourth embodiment of the invention, and shows the construction of a so called pantograph mechanism 51 in the cutting member interval adjustment mechanism 7 of the multiple-strip cutting device 2. The pantograph mechanism 51 is connected to a control motor M4 that is installed in a base member 53 that is fastened inside of the side plate 13 (not shown in the figure) (see FIG. 1), where the screw member 55 of the control motor M4 screws into an upper position of a connection member 57 of the pantograph mechanism 51, and by rotating the control motor M4 in the reverse direction, the crossed connection members 59 of the pantograph mechanism 51 move so that they extend or contract with even spacing. The pantograph mechanism 51 comprises evenly spaced support members 61 located underneath the crossed connection members 59, and these support members 61 are supported by slide shafts 63, which are round rods that run along the width direction (direction that crosses the conveyance direction S) on the inside of the side plates 13 (not shown in the figure), and by attaching the cutting members 5 to theses support members 61, it is possible to adjust the interval between the cutting members so that they are evenly spaced.

In the embodiments described above, the case of using circular rotating blades 5 as the cutting members was explained, however, it is also possible to cut the food dough F1 using water jets (high pressure water spray), etc.

Moreover, in the embodiments described above, the case was explained in which, in order to align the center position C of the width of the food dough F to a set position that is displaced just the alignment displacement amount H from the reference position D, the center position C is moved in the width direction of the food dough F, however, it is also possible to locate the multiple-strip cutting device 2 so that it can move in the width direction in order that the reference position D can be aligned to a position that is displaced just the alignment displacement amount H with respect to the center position C. The movement mechanism for moving the multiple-strip cutting device 2 can be a well known movement mechanism, for example, it is possible to use a screw mechanism like the rotating shaft 45 of the movable support member 49 that supports the rotating blade 48 so that they can move as explained in the second embodiment, and by constructing a detection device such as distance sensors, the movement position of the multiple-strip cutting device 2 can be controlled. In this case as well, it is possible to align the center position C of the width of the band shaped food dough F and the reference position D to a position that is displaced just the alignment displacement amount H.

What is claimed is:

1. A food dough cutting device comprising:
  a conveyor that conveys band shaped food dough;
  a dough width detection device that detects both end positions of the food dough to generate a detection signal;
  a control device that calculates the center position and width dimension of the width of the food dough based on the detection signal from the dough width detection device;
  an alignment device that aligns the center position of the width of the food dough to a conveyance position; and
  a multiple-strip cutting device that is located downline from the conveyor and that comprises a cutting member that divides the food dough into multiple food dough strips in the conveyance direction; and
  a food dough piece cutting device that cuts the food dough strips into food dough pieces having a specified weight; wherein
  the multiple-strip cutting device divides the band shaped food dough into at least four food dough strips by using at least three cutting members, and
  the control device
    controls operation of the dough piece cutting device in order to cut the at least four food dough strips into at least four food dough pieces, when the weight of each of the at least four food dough strips is weighed by a weighing conveyor and a weighed value is matched to a set value,
    calculates cut lengths of each of the at least four food dough pieces,
    calculates a ratio of both sides to others by using an average cut length of the food dough pieces on both sides to an average cut length of other food dough pieces for the at least four dough pieces,
    adjusts, based on the ratio of both sides to the others, the cutting width of each of the at least four food dough strips, by adjusting both an interval between the cutting members that are located on both sides, and an alignment displacement, and
    controls the alignment device, so that number of cuts made per unit time, when cutting each of the food dough strips into food dough pieces having a specified weight, is made uniform among all of the food dough strips.

2. The food dough cutting device according to claim 1, wherein;
  the control device controls operation in order to cut the food dough strips into the food dough pieces when the weight of each of the food dough strips that are cut and weighed by the weighing conveyors match the set value.

3. The food dough cutting device according to claim 1, wherein;
  the control device adjusts an alignment displacement that is a displacement amount with respect to a reference position by an installation position of the cutting member that is located at the center,
    based on an average width dimension of the food dough, and a ratio an average cut lengths of one side food dough pieces to an average cut lengths of another side food dough pieces.

* * * * *